(12) United States Patent
Yang

(10) Patent No.: US 12,719,585 B2
(45) Date of Patent: Aug. 25, 2026

(54) OPTICAL SIGNAL RECEIVING APPARATUS, METHOD AND SYSTEM, OPTICAL LINE TERMINAL, COMPUTER-READABLE STORAGE MEDIUM

(71) Applicant: ZTE CORPORATION, Shenzhen (CN)

(72) Inventor: Bo Yang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 188 days.

(21) Appl. No.: 18/571,343

(22) PCT Filed: Jun. 16, 2022

(86) PCT No.: PCT/CN2022/099116
§ 371 (c)(1),
(2) Date: Dec. 18, 2023

(87) PCT Pub. No.: WO2022/262803
PCT Pub. Date: Dec. 22, 2022

(65) Prior Publication Data
US 2024/0283545 A1 Aug. 22, 2024

(30) Foreign Application Priority Data
Jun. 18, 2021 (CN) ......................... 202110677407.8

(51) Int. Cl.
*H04B 10/67* (2013.01)
*H04B 10/69* (2013.01)
*H04Q 11/00* (2006.01)

(52) U.S. Cl.
CPC ....... *H04B 10/675* (2013.01); *H04B 10/6972* (2013.01); *H04Q 11/0067* (2013.01)

(58) Field of Classification Search
CPC ............................ H04B 10/673; H04B 10/675
See application file for complete search history.

(56) References Cited

U.S. PATENT DOCUMENTS

2001/0021049 A1* 9/2001 De Girolamo ..... H04Q 11/0062 398/79
2005/0014300 A1* 1/2005 Welch ................ H04B 10/2914 438/16

(Continued)

FOREIGN PATENT DOCUMENTS

CN 101536370 A 9/2009
CN 105223663 A 1/2016

(Continued)

OTHER PUBLICATIONS

WIPO, International Search Report issued on Sep. 2, 2022.

(Continued)

*Primary Examiner* — Nathan M Cors
(74) *Attorney, Agent, or Firm* — Li & Cai Intellectual Property (USA) Office

(57) ABSTRACT

The present disclosure provides an optical signal receiving apparatus, an optical line terminal, an optical signal receiving system, an optical signal receiving method, and a computer-readable storage medium. The optical signal receiving apparatus includes: a first filter configured to perform wavelength division processing on original optical signals, and perform at least one of following operations: outputting at least one of a first optical signal corresponding to a first wavelength range or a second optical signal corresponding to a second wavelength range; an amplifier configured to amplify the first optical signal; a second filter configured to receive the amplified first optical signal, and perform noise reduction processing on the amplified first optical signal; and the detection element is configured to receive and convert at least one of the first optical signal subjected to the noise reduction processing or the second optical signal into a transmission electrical signal.

12 Claims, 6 Drawing Sheets

(56) References Cited

U.S. PATENT DOCUMENTS

2008/0267625 A1 10/2008 Effenberger
2009/0190931 A1* 7/2009 Hamano ............... H04J 14/026 398/99
2010/0166425 A1* 7/2010 Onaka .................. H04B 10/675 398/79
2010/0266293 A1 10/2010 Sone et al.
2017/0288782 A1 10/2017 Stiscia et al.
2022/0158740 A1* 5/2022 Cao ........................ H04B 10/40

FOREIGN PATENT DOCUMENTS

KR 20110064352 A 6/2011
WO WO2008056876 A1 5/2008

OTHER PUBLICATIONS

European Patent Office, the Extended European Search Report dated Aug. 30, 2024, for corresponding EP application No. 22824276. 4.

* cited by examiner

OPTICAL SIGNAL RECEIVING APPARATUS, METHOD AND SYSTEM, OPTICAL LINE TERMINAL, COMPUTER-READABLE STORAGE MEDIUM

CROSS-REFERENCE TO RELATED APPLICATIONS

The present disclosure claims the priority to Chinese Patent Application No. 202110677407.8 filed on Jun. 18, 2021, the contents of which are incorporated herein by reference in their entirety.

TECHNICAL FIELD

The present disclosure relates to the field of communication technology, and in particular, to an optical signal receiving apparatus, an optical signal receiving method, an optical line terminal, an optical signal receiving system, and a computer-readable storage medium.

BACKGROUND

With a continuous increase of bandwidth demand of a Passive Optical Network (PON), a speed of an optical signal is continuously increasing, resulting in an increase of levels of uplink speeds of the PON. For example, in a 50 G PON system, optical signals at a speed level of about 50 G, a speed level of about 12.5 G, and a speed level of about 25 G are desired to be supported simultaneously in an uplink. In a case where the PON system can support the optical signals at various different speeds, due to a fact that wavelength ranges corresponding to the optical signals at different, if an optical receiver at the side of an optical line terminal (OLT) adopts a semiconductor optical amplifier (SOA), a band-pass filter (BPF), and a photodetector (PD), i.e., an SOA+BPF+PD receiver architecture, since the BPF in such architecture is a narrowband filter, and an uncooled laser at a transmitting end operates in a relatively wide wavelength range, a wavelength range of the narrowband filter may be not matched with the wavelength range of the uncooled laser, which may produce a result that the SOA+BPF+PD receiver architecture cannot compatibly support the optical signals at the speed level of about 50 G, the speed level of about 12.5 G, and the speed level of about 25 G in a case where the optical signals at the speed level of about 12.5 G and the speed level of about 25 G are transmitted by the uncooled laser.

A solution in the related technology is that: the optical signals at the speed level of about 12.5 G and the speed level of about 25 G are transmitted by a transmitter equipped with a cooler, and correspondingly, wavelength ranges corresponding to the optical signals at the speed level of about 12.5 G and the speed level of about 25 G are narrowed to 4 nm, which is the same as a wavelength range corresponding to the optical signal at the speed level of about 50 G. But due to the use of the transmitter equipped with the cooler, such solution leads to a significant increase in the cost of a terminal optical module. Therefore, if a manufacturing cost of the terminal optical module is not to be increased, the receiver architecture in the related technology is faced with some problems in the aspect of simultaneous supporting the optical signals at different speeds.

SUMMARY

In an aspect, an embodiment of the present disclosure provides an optical signal receiving apparatus applicable to receiving optical signals at multiple speeds, including: a first filter, an amplifier, a second filter, and a detection element; the first filter is configured to perform wavelength division processing on original optical signals, and perform at least one of following operations: outputting a first optical signal corresponding to a first wavelength range through a first output optical path, or outputting a second optical signal corresponding to a second wavelength range through a second output optical path; the amplifier is configured to amplify the first optical signal corresponding to the first wavelength range to obtain the amplified first optical signal; the second filter is configured to receive the amplified first optical signal, perform noise reduction processing on the amplified first optical signal, and transmit the first optical signal subjected to the noise reduction processing to the detection element; and the detection element is configured to receive at least one of the first optical signal subjected to the noise reduction processing or the second optical signal corresponding to the second wavelength range, and convert at least one of the first optical signal subjected to the noise reduction processing or the second optical signal corresponding to the second wavelength range into a transmission electrical signal.

In an aspect, an embodiment of the present disclosures provides an optical line terminal, including: the optical signal receiving apparatus described above.

In an aspect, an embodiment of the present disclosure provides an optical signal receiving system, including: the optical line terminal described above, and an optical network unit.

In an aspect, an embodiment of the present disclosure provides an optical signal receiving method applicable to receiving optical signals at multiple speeds, including: performing wavelength division processing on original optical signals, and outputting at least one of a first optical signal corresponding to a first wavelength range or a second optical signal corresponding to a second wavelength range; amplifying the first optical signal corresponding to the first wavelength range to obtain the amplified first optical signal; and receiving the amplified first optical signal, performing noise reduction processing on the amplified first optical signal, and converting at least one of the first optical signal subjected to the noise reduction processing or the second optical signal corresponding to the second wavelength range into a transmission electrical signal.

In an aspect, an embodiment of the present disclosure provides a computer-readable storage medium having stored therein a computer program, the computer program, executed by a processor, causes the processor to implement the optical signal receiving method described above.

DETAIL DESCRIPTION OF EMBODIMENTS

Figure 1:
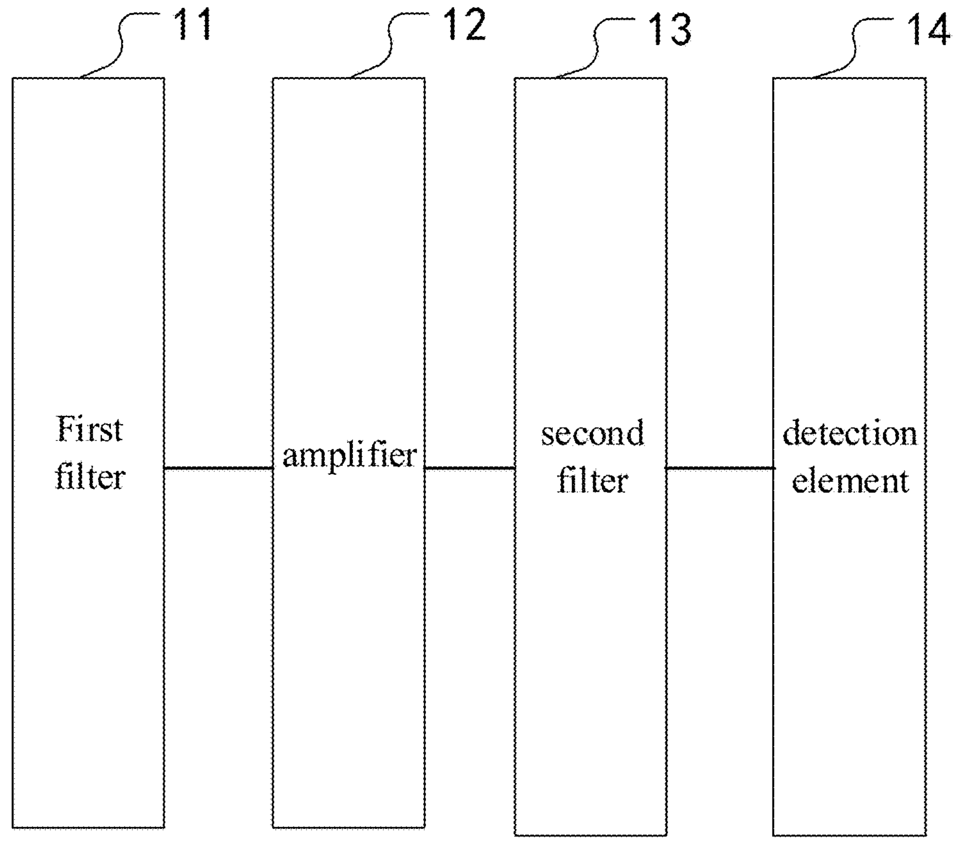
FIG. 1 is a schematic structural diagram of an optical signal receiving apparatus according to an embodiment of the present disclosure.

In order to enable those of ordinary skill in the art to better understand technical solutions of the present disclosure, an optical signal receiving apparatus, an optical line terminal, an optical signal receiving system, an optical signal receiving method, and a computer-readable storage medium provided by the present disclosure are described in detail below with reference to the drawings.

Exemplary embodiments will be described more fully below with reference to the drawings, but the exemplary embodiments described herein may be embodied in different forms, and should not be interpreted as being limited to the embodiments described herein. The embodiments are provided to make the present disclosure more thorough and complete, and are intended to enable those of ordinary skill in the art to fully understand the scope of the present disclosure.

The term “and/or” used herein includes any or all combinations of one or more associated listed items.

The terms used herein are merely used to describe specific embodiments, and are not intended to limit the present disclosure. As used herein, “a” and “the” which indicate a singular form are intended to include a plural form, unless expressly stated in the context. It should be further understood that the terms “comprise/include” and/or “be made/formed of” used herein indicate the presence of the particular features, integers, operations, elements and/or components, but do not exclude the presence or addition of one or more other features, integers, operations, elements, components and/or combinations thereof.

The embodiments of the present disclosure may be described with reference to plans and/or cross-sectional views with the aid of idealized schematic diagrams of the present disclosure. Accordingly, the exemplary drawings may be modified according to manufacturing techniques and/or tolerances. Therefore, the embodiments are not limited to that illustrated by the drawings, but include modifications to configuration formed based on a manufacturing process. Thus, regions shown in the drawings are illustrative, and shapes of the regions shown in the drawings illustrate shapes of regions of elements, but are not intended to make limitations.

Unless otherwise defined, all terms (including technical terms and scientific terms) used herein have the same meaning as commonly understood by those of ordinary skill in the art. It should be further understood that terms, such as those defined in commonly used dictionaries, should be interpreted as having a meaning that is consistent with a meaning in the context of the existing technology and the background of the present disclosure, and should not be interpreted in an idealized or overly formal sense unless expressly so defined herein.

FIG. 1 is a schematic structural diagram of an optical signal receiving apparatus applicable to receiving optical signals at multiple speeds according to an embodiment of the present disclosure. As shown in FIG. 1, the receiving apparatus includes: a first filter 11, an amplifier 12, a second filter 13, and a detection element 14. The first filter 11 is configured to perform wavelength division processing on original optical signals, output a first optical signal corresponding to a first wavelength range through a first output optical path, and/or output a second optical signal corresponding to a second wavelength range through a second output optical path. The amplifier 12 is configured to amplify the first optical signal corresponding to the first wavelength range to obtain the amplified first optical signal. The second filter 13 is configured to receive the amplified first optical signal, perform noise reduction processing on the amplified first optical signal, and transmit the first optical signal subjected to the noise reduction processing (i.e., the noise-reduced first optical signal) to the detection element 14. The detection element 14 is configured to receive the noise-reduced first optical signal and/or the second optical signal corresponding to the second wavelength range, and convert the noise-reduced first optical signal and/or the second optical signal corresponding to the second wavelength range into a transmission electrical signal.

The amplifier 12 in the optical signal receiving apparatus provided in the present disclosure includes an optical amplifier, which may include a semiconductor optical amplifier (SOA). The first filter 11 may include a single Thin Film Filter (TFF), a micro-optical module Z-Block, and/or a photonic integrated device (e.g., a Mach-Zehnder interferometer, MZI). The first filter 11 in the optical signal receiving apparatus provided in the present disclosure may be referred to as a filter module and is configured to perform a wavelength division function, any device capable of performing the wavelength division function may be used as the first filter, and the implementation of the first filter 11 is not limited in the present disclosure. The second filter 13 is mainly configured to filter out noise generated by the amplifier 12, and accordingly, parameters of the second filter 13 may be flexibly set by those of ordinary skill in the art, as long as the second filter 13 can filter out the noise generated by the amplifier. In addition, the detection element 14 may include various detectors such as a PIN detector or an APD detector.

Due to a certain corresponding relationship between speed levels and wavelength ranges of signals, in a case where the original optical signals may be at a plurality of speed levels, wavelength ranges of the optical signals corresponding to different speed levels are different; therefore, in the architecture of an optical amplifier plus a narrowband filter plus a detector in the related technology, the narrowband filter may cut off the optical signals beyond a narrowband wavelength range, with the result that the receiver cannot receive the optical signals which are at a low speed level, have a relatively wide wavelength range, and go beyond the narrowband wavelength range, that is, the architecture of the optical amplifier plus the narrowband filter plus the detector in the related technology cannot compatibly support the optical signals at multiple speeds. In the optical signal receiving apparatus provided in the present disclosure, a wavelength range of the original optical signals is divided into the first wavelength range and the second wavelength range in advance, and correspondingly, the optical signal in the first wavelength range and the optical signal in the second wavelength range are respectively transmitted through the first output optical path and the second output optical path of the filter, so that a compatible reception of the optical signals at multiple speeds is realized. The first output optical path may be a reflection optical path, and the second output optical path may be a transmission optical path; or, the first output optical path may be the transmission optical path, and the second output optical path may be the reflection optical path, which is not limited in the present disclosure.

The optical signal receiving apparatus according to the present disclosure may be provided in various optical devices, for example, the optical signal receiving apparatus may be provided inside an optical line terminal or inside an optical network unit. The present disclosure does not limit the position of the optical signal receiving apparatus, as long as the optical signal receiving apparatus can realize the compatible reception of the optical signals at multiple speeds.

The detection element in the optical signal receiving apparatus provided in the present disclosure may be implemented in various manners. For example, two detectors respectively corresponding to the first optical signal and the second optical signal may be provided, so that the two optical signals may be respectively received through the two detectors. For example, the second filter may be provided with two input optical paths in addition to having the noise reduction function, so that the first optical signal and/or the second optical signal can be merged into one optical signal through the two input optical paths to be output to the detection element, in this case, the number of second filters may be one or two, and the details of the implementation are not limited in the present disclosure, as long as the detection element is enabled to convert the two optical signals into the transmission electrical signal.

Thus, in the optical signal receiving apparatus provided in the present disclosure, the first filter can perform the wavelength division processing on the original optical signals to obtain the first optical signal corresponding to the first wavelength range and/or the second optical signal corresponding to the second wavelength range; and the first optical signal is to be amplified by the amplifier and subjected to the noise reduction processing by the second filter, so as to be improved in quality. Moreover, the detection element can receive the noise-reduced first optical signal and/or the second optical signal corresponding to the second wavelength range, so as to convert the noise-reduced first optical signal and/or the second optical signal corresponding to the second wavelength range into the transmission electrical signal to output it. Thus, in view of the characteristic that the wavelength ranges of the optical signals at multiple speeds are different, in the optical signal receiving apparatus provided in the present disclosure, by reasonably setting a transmission wavelength and a reflection wavelength of the first filter, the optical signal in the first wavelength range and the optical signal in the second wavelength range can be respectively output through the different output optical paths. The optical signal receiving apparatus can perform the wavelength division processing by the first filter according to the corresponding relationship between the speeds and the wavelength ranges of signals, so as to divide the original optical signals into the optical signals in two paths, and thus the receiving apparatus is applicable to the optical signals at multiple speeds.

Figure 2:
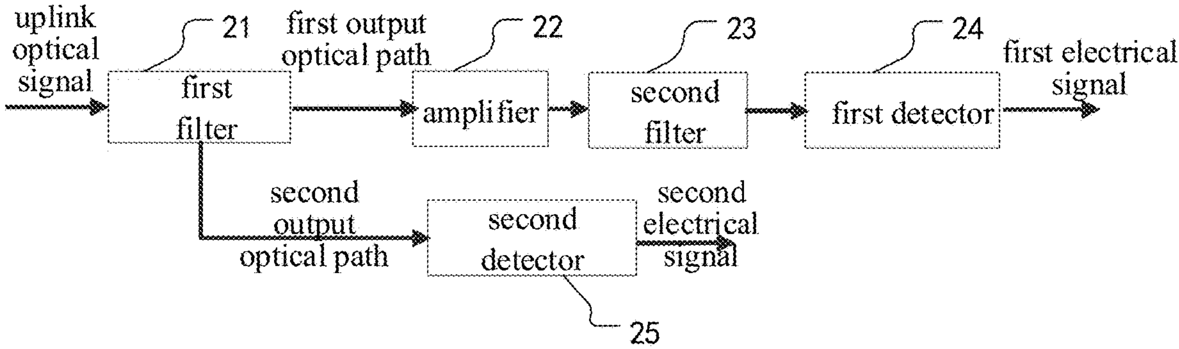
FIG. 2 is a schematic structural diagram of an optical signal receiving apparatus according to an embodiment of the present disclosure.

FIG. 2 is a schematic structural diagram of an optical signal receiving apparatus applicable to receiving optical signals at multiple speeds according to an embodiment of the present disclosure. As shown in FIG. 2, the receiving apparatus includes: a first filter 21, an amplifier 22, a second filter 23, a first detector 24, and a second detector 25. Functions of the first filter 21, the amplifier 22, and the second filter 23 are similar to those of the first filter 11, the amplifier 12, and the second filter 13 shown in FIG. 1, and thus will not be repeated here. Thus, the detection element in the optical signal receiving apparatus provided in the present disclosure may include the first detector 24 and the second detector 25. The first detector 24 is connected to the second filter 23, and is configured to receive the noise-reduced first optical signal, and convert the noise-reduced first optical signal into a first electrical signal; and the second detector 25 is connected to the first filter 21, and is configured to receive the second optical signal corresponding to the second wavelength range, and convert the second optical signal corresponding to the second wavelength range into a second electrical signal. Accordingly, the transmission electrical signal in the optical signal receiving apparatus provided in the present disclosure is generated according to the first electrical signal and/or the second electrical signal.

Due to the certain corresponding relationship between speed levels and wavelength ranges of signals, in a case where the original optical signals may be at a plurality of speed levels, wavelength ranges of the optical signals corresponding to different speed levels are different; therefore, in the architecture of an optical amplifier plus a narrowband filter plus a detector in the related technology, the narrowband filter may cut off the optical signals beyond a narrowband wavelength range, with the result that the receiver cannot receive the optical signals which are at a low speed level, have a relatively wide wavelength range and go beyond the narrowband wavelength range, that is, the architecture of the optical amplifier plus the narrowband filter plus the detector in the related technology cannot compatibly support the optical signals at multiple speeds. In the optical signal receiving apparatus provided in the present disclosure, a wavelength range of the original optical signals is divided into the first wavelength range and the second wavelength range in advance, and correspondingly, the optical signal in the first wavelength range and the optical signal in the second wavelength range are respectively transmitted through the first output optical path and the second output optical path of the filter, so that a compatible reception of the optical signals at multiple speeds is realized.

A passband range of the first output optical path of the first filter is corresponding to the first wavelength range, and a passband range of the second output optical path of the first filter is corresponding to the second wavelength range; and thus the first filter is configured to perform transmission processing or reflection processing on the first optical signal corresponding to the first wavelength range and then transmit the first optical signal to the amplifier through the first output optical path, and perform reflection processing or transmission processing on the second optical signal corresponding to the second wavelength range and then transmit the second optical signal to the second detector through the second output optical path; and in some implementations, the division of the first wavelength range and the second wavelength range is carried out according to a corresponding relationship between speeds and wavelength ranges of the optical signals, the first wavelength range is corresponding to the original optical signal at a first speed, and the second wavelength range is corresponding to the original optical signal at a second speed. The corresponding relationship between the speeds and the wavelength ranges of the optical signals is determined according to parameters of a laser of an optical signal transmitting end. In some implementations, the first speed is greater than the second speed, and the first wavelength range is less than the second wavelength range. For example, in some implementations, the optical signal receiving apparatus can compatibly receive optical signals at three speeds, and correspondingly, the first speed includes 50 gigabits per second (Gbit/s), and the second speed includes 12.5 Gbit/s and/or 25 Gbit/s.

The first speed is at a first speed level, and the second speed is at a second speed level. The corresponding relationship between the speeds and the wavelengths of the optical signals is a corresponding relationship between the speed levels and the wavelength ranges of the optical signals.

Figure 4:
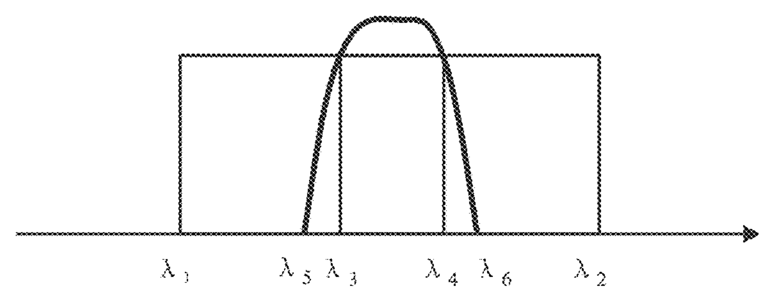
FIG. 4 is a schematic diagram illustrating a division of an uplink wavelength range according to an embodiment of the present disclosure.

The division of the first wavelength range and the second wavelength range depends on the parameters of the laser of the optical signal transmitting end, and the optical signal transmitting end may be an optical network unit. For example, in some implementations, the first wavelength range is in a middle region of the second wavelength range, and the second wavelength range includes: a first sub-range on a first side (e.g. a left side) of the first wavelength range, and a second sub-range on a second side (e.g. a right side) of the first wavelength range. That is, the second wavelength range includes portions of a preset wavelength range beyond the first wavelength range. The first sub-range may be on the first side of the first wavelength range and spaced apart from the first wavelength range by a first preset wavelength; and the second sub-range may be on the second side of the first wavelength range and spaced apart from the first wavelength range by a second preset wavelength. The first preset wavelength may be the same as or different from the second preset wavelength. For example, FIG. 4 is a schematic diagram illustrating a division of an uplink wavelength range according to an embodiment of the present disclosure, and as illustrated by FIG. 4, the first wavelength range is [λ23, λ24], and the second wavelength range includes: the first sub-range [λ21, λ25] on the left side of the first wavelength range and spaced apart from the first wavelength range by the first preset wavelength, and the second sub-range [λ6, λ2] on the right side of the first wavelength range and spaced apart from the first wavelength range by the second preset wavelength. The first preset wavelength is equal to a difference between λ3 and λ5, and the second preset wavelength is equal to a difference between λ6 and λ4. In such case, the passband range of the first output optical path of the first filter is corresponding to the first wavelength range, and the passband range of the second output optical path of the first filter is corresponding to the wavelengths within the second wavelength range and beyond the first wavelength range (that is, within the first sub-range and the second sub-range); and the first filter is configured to perform the transmission processing or the reflection processing on the first optical signal corresponding to the first wavelength range and then transmit the first optical signal to the amplifier through the first output optical path, and perform the reflection processing or the transmission processing on the second optical signal corresponding to a wavelength within the second wavelength range and beyond the first wavelength range (that is, within the first sub-range and the second sub-range) and then transmit the second optical signal to the second detector through the second output optical path.

In some implementations, the first wavelength range and the second wavelength range are not overlapped and a spacing transition band is provided between the first wavelength range and the second wavelength range, and in this case, the second optical signal is the optical signal corresponding to the second wavelength range. The spacing transition band refers to a third wavelength range between the first wavelength range and the second wavelength range, and the third wavelength range is not overlapped with the first wavelength range and the second wavelength range, so that a transition waveband serving as a spacing is provided between the first wavelength range and the second wavelength range. The present disclosure does not limit a division manner of the first wavelength range and the second wavelength range.

Next, a detailed description is given below by taking the first wavelength division manner (that is, the first wavelength range is in the middle region of the second wavelength range) in the above implementations as an example. For ease of understanding, an application scenario of the present disclosure is first briefly introduced.

Figure 3:
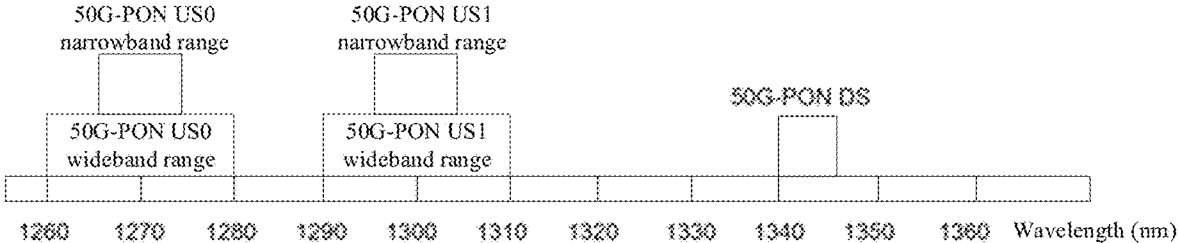
FIG. 3 is a schematic diagram illustrating a narrowband range and a wideband range according to an embodiment of the present disclosure.

In recent years, optical access networks based on the Time-Division Multiplexing Passive Optical Network (TDM-PON) technology have been rapidly developed, and 10 Gigabit-Passive Optical Networks (10 G PONs) have been deployed in a large scale and have gradually replaced Gigabit-Capable Passive Optical Networks (GPONs). In the future, for realizing fixed-mobile integration and full-service access such as large-bandwidth home broadband access, higher-bandwidth government-enterprise access, and 5 G small base station backhaul at the access network level, a higher expectation is proposed on the bandwidth of the PON. A 50 Gbit/s PON (based on Time-Division Multiplexing, i.e., a 50 G TDM PON) has become an evolution direction of the 10 G PON. The ITU-T standard G.hsp.pmd has currently defined three uplink speed levels of about 12.5 G, about 25 G, and about 50 G in a 50 G PON system. Therefore, in future actual deployment processes, ONUs for three different uplink speeds may exist in a same Optical Distribution Network (ODN), and accordingly, an OLT device and an OLT optical module are desired to compatibly support three uplink receiving speeds simultaneously. In a case where an uplink speed is at about 50 G, the line speed is increased so greatly that it is hard to meet a link budget expectation of 32 decibels or above of a PON by an APD receiver of the related technology. In order to reuse the deployed ODN, a high-sensitivity receiver is to be implemented, and a preamplifier is a solution capable of effectively improving the sensitivity of the receiver. However, the amplifier generates amplified spontaneous emission (ASE) noise which affects the performance of the receiver, and therefore, an optical filter (e.g., a BPF) is to be added, and a wavelength of the filter is to be matched with a wavelength of a transmitter. In order to reduce a cost of design of the filter and avoid using a tunable filter, the wavelength of the transmitter is to be narrowed to a certain range, and therefore, a narrow wavelength solution is desired for the 50 G PON. For a PON system, due to a terminal in the PON system expects an extremely low cost of devices, an uncooled DML laser is generally adopted in an uplink, and the laser has a relatively wide wavelength range which is usually about 20 nm. Therefore, according to the uplink wavelength planning in the current standard of the 50 G PON, the two wavelength range options, including a wide wavelength range of about 20 nm and a narrow wavelength range of about 4 nm, are defined for the speed of about 50 G, and the narrow wavelength range is in the middle of the wide wavelength range. For example, FIG. 3 is a schematic diagram illustrating a narrowband range and a wideband range according to an embodiment of the present disclosure. In FIG. 3, USO and USI represent two wavelength solutions for the 50 G PON coexisting with GPON and XGPON, respectively. Thus, in a case where the 50 G PON system meets an optical power budget above 32 decibels, an OLT-side optical receiver at the speed level of about 50 G is desired to adopt the SOA+BPF+PD receiver architecture, but such architecture cannot be simultaneously compatible with the uncooled laser at speed levels of about 12.5 G and 25 G at the transmitting end. Therefore, an OLT reception optical path is divided into two optical paths by a 1:2 optical splitter, and two receivers are adopted to respectively receive uplink signals at the speed of about 50 G and uplink signals at the speed of about 12.5 G/25 G. Since the optical splitter is not sensitive to wavelengths, a loss of 3 decibels is added to the original link budget, which leads to a serious challenge to the performance of the optical device. Moreover, two pairs of uplink signal pins are desired to be provided in the above solution, but the two pairs of uplink signal pins are not favorable for miniaturization packaging of the OLT optical module. The optical signal receiving apparatus provided in the present disclosure can solve the problems in the above application scenario by realizing a wavelength division through the first filter.

As for the uplink wavelength planning of the 50 G PON, as shown in FIG. 4, the first filter has following characteristics: in a case where an uplink broadband wavelength range of the 50 G PON is [λ1, λ2] and an uplink narrowband wavelength range of the 50 G PON is [λ3, λ4], the first output optical path (e.g., the reflection optical path or the transmission optical path) of the first filter has a passband range of [λ3, λ4] and cut-off wavelength ranges of [λ1, λ5] and [26, 22], and the second output optical path (e.g., the transmission optical path or the reflection optical path) of the first filter has passband ranges of [λ1, λ5] and [λ6, λ2] and a cut-off wavelength range of [λ3, λ4]. The wavelength ranges of [λ5, λ3] and [λ4, λ6] are transition bands of the first filter, and the optical signals in these wavelength ranges partially enter the first output optical path and partially enter the second output optical path. For example, for an uplink wavelength option, from about 1260 nm to about 1280 nm, of the 50 G PON, λ1 is 1260 nm, λ2 is 1280 nm, and λ3, λ4, λ5, and λ6 may be wavelengths in the range from 1260 nm to 1280 nm (exclusive of 1260 nm and 1280 nm). For example, λ3 is about 1268 nm, λ4 is about 1272 nm, λ5 is about 1266 nm, and λ6 is about 1274 nm. Thus, $\lambda 1<\lambda 5<\lambda 3<\lambda 4<\lambda 6<\lambda 2$. The optical amplifier may include an SOA, the filter may include a single TFF, a micro-optical module Z-Block, and a photonic integrated device (e.g., the MZI), and the detection element may include a PIN detector or an APD detector. In some implementations, the optical signal receiving apparatus may be an OLT multi-speed receiving apparatus, which may be formed by discrete devices and may be packaged into an optical receiving module or a hybrid integrated optical chip. Taking the OLT multi-speed receiving apparatus being a multi-speed optical receiving module as an example, the multi-speed optical receiving module may further include an optical path coupling device (e.g., a lens), an optical adapter, a metal housing, and a Flexible Printed Circuit (FPC).

Figure 5:
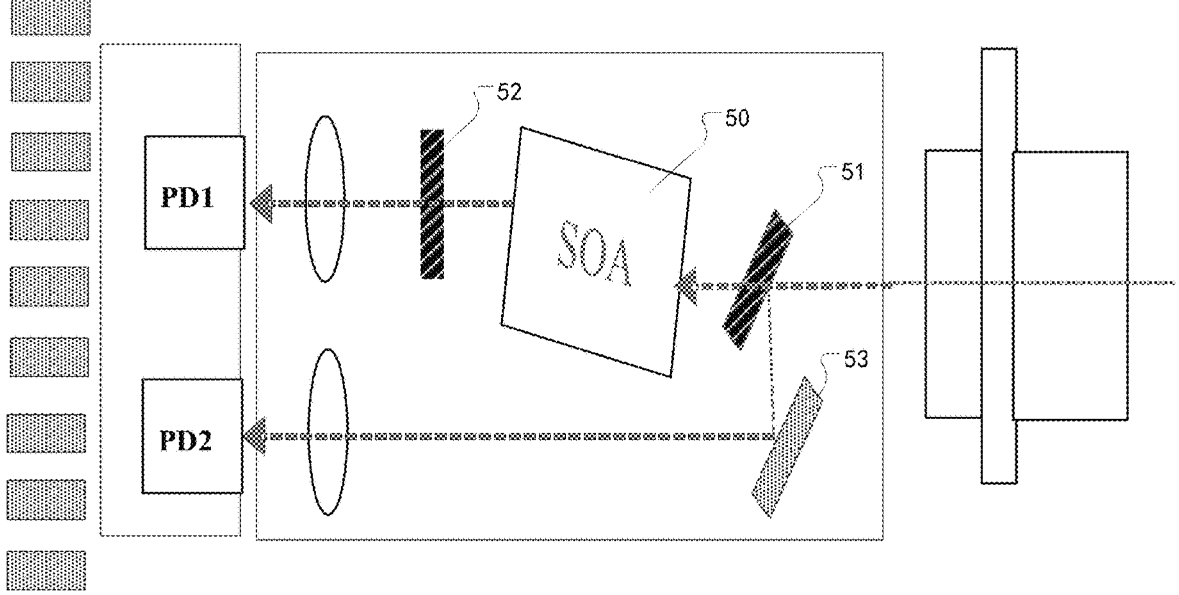
FIG. 5 is a schematic structural diagram of a multi-speed optical receiving module according to an embodiment of the present disclosure.

A main function of the second filter is to filter out the noise generated by the amplifier. Correspondingly, the second filter has following characteristics: a reflection-spectrum passband or a transmission-spectrum passband of the second filter is equal to a 3-dB bandwidth of the first filter (i.e., a passband loss of the first filter is reduced by a wavelength range corresponding to 3 decibels (dBs)). FIG. 5 is a schematic structural diagram of a multi-speed optical receiving module according to an embodiment of the present disclosure. As shown in FIG. 5, the multi-speed optical receiving module includes: an SOA 50, a filter 51, a filter 52, a detector PD1, a detector PD2, lenses (corresponding to circular parts in FIG. 5), an optical adapter, a total reflection plate 53, and an FPC. The uplink optical signal (the first optical signal) corresponding to the first wavelength range is transmitted through the filter 51 and then enters the SOA 50, the SOA 50 amplifies and outputs the uplink optical signal, the amplified spontaneous emission (ASE) noise of the amplified uplink optical signal is filtered out by the filter 52, and then the amplified uplink optical signal is coupled through a lens into the detector PD1 and converted into the first electrical signal; the uplink optical signal in the second wavelength range and beyond the first wavelength range is reflected by the filter 51, reflected by the total reflection plate 53, and is then coupled through a lens into the detector PD2, and converted into the second electrical signal; and the uplink optical signal in the second wavelength range and in the transition bands of the filter 51 is partially transmitted through the filter 51 into the SOA 50, amplified by the SOA 50, filtered by the filter 52, and then is coupled into the detector PD1, and converted into the first electrical signal, and is partially reflected by the filter 51, reflected by the total reflection plate 53, and then is coupled into the detector PD2, and converted into the second electrical signal. In order to ensure that the filter 52 can allow the optical signal in the transition bands of the filter 51 to pass through, a transmission-spectrum passband of the filter 52 is equal to the 3-dB bandwidth of the filter 51 (i.e., the passband loss of the filter 51 is reduced by the wavelength range corresponding to 3 dBs). The multi-speed optical receiving module further includes the FPC and is connected to an external circuit through the FPC, and the FPC is connected to the detector PDI and the detector PD2, and outputs the first electrical signal and the second electrical signal converted by the detector PDI and the detector PD2 to the external circuit. In some implementations, the external circuit may be further connected to the detector PDI and the detector PD2 and control pins of the SOA 50 through the FPC, so as to perform functions of supplying power, reading monitoring signals, and adjusting currents. In the multi-speed optical receiving module, the detector PD1 and the detector PD2 converting the input optical signals into the electrical signals further includes converting, after converting the optical signals into current signals, the current signals into differential voltage signals through a transimpedance amplifier (TIA) circuit to output them.

In the multi-speed optical receiving module, the optical characteristics of the filter 51 conform to the aforesaid definition of the wavelengths, that is, for the 50 G PON having the uplink broadband wavelength range of [λ1, λ2] and the uplink narrowband wavelength range of [λ3, λ4], the transmission optical path of the filter 51 has a passband range of [λ3, λ4] and cut-off wavelength ranges of [λ1, λ5] and [λ6, λ2], and the reflection optical path of the filter 51 has passband ranges of [λ1, λ5] and [λ6, λ2] and a cut-off wavelength range of [λ3, λ4]. The wavelength ranges of [λ5, λ3] and [λ4, λ6] are the transition bands of the filter 51, and the optical signals in the transition bands partially enter the transmission optical path and partially enter the reflection optical path. The filter 52 performs a total reflection on the optical signals in the 3-dB bandwidth range of the filter 51 in the uplink wavelength range of 50 G PON, that is, for the reflection optical path of the filter 52, the wavelengths, in the uplink narrowband wavelength range of the 50 G PON, with a passband is reduced by 3 dBs compared with the transition bands of the filter 51 belong to a passband.

In addition, in the optical signal receiving apparatus in the present example, the first electrical signal and the second electrical signal may be output to a signal receiving end through the first detector and the second detector respectively, and in this case, the signal receiving end is desired to be provided with two pairs of receiving pins configured to respectively receive the first electrical signal and the second electrical signal. In a case where the optical signal receiving apparatus does not include a signal preprocessing module, in order to facilitate subsequent processing on the received electrical signals by the signal receiving end (i.e., an optical line terminal), a speed level of the received signal is to be determined according to a time slot scheduling table. Accordingly, the optical line terminal includes: a signal selection module configured to determine a speed level of the signal corresponding to a current scheduled time slot according to a corresponding relationship, between scheduled time slots and speed levels of signals, stored in the time slot scheduling table, and select, according to the speed level of the signal, the first electrical signal or the second electrical signal as an effective electrical signal. The effective electrical signal refers to an electrical signal effectively received and actually used for the subsequent processing. Since the optical line terminal in the optical signal receiving apparatus is provided with two pairs of receiving pins for respectively receiving the first electrical signal and the second electrical signal, and the first electrical signal and the second electrical signal are respectively corresponding to the optical signals with different wavelengths and at different speed levels, in a case where a transmitting end transmits a high-speed-level optical signal, the first electrical signal is an effective electrical signal component, and the second electrical signal is an invalid electrical signal component, at this time, the first electrical signal is determined as the effective electrical signal, and the receiving pins corresponding to the first electrical signal are controlled to operate; in a case where the transmitting end transmits a low-speed-level optical signal, the first electrical signal or the second electrical signal may be the effective electrical signal component, one of the first electrical signal and the second electrical signal that has the higher quality is selected as the effective electrical signal by the signal selection module, and the corresponding receiving pins are controlled to operate. In a case where the effective electrical signal is selected according to the wavelength ranges of the signals, the signal selection module is configured to respectively determine a bit error rate of the first electrical signal in a physical layer and a bit error rate of the second electrical signal in the physical layer, and take one of the first electrical signal and the second electrical signal that has the lower bit error rate as the effective electrical signal.

In the optical signal receiving apparatus, in a case where an uplink signal is at the speed level of about 25 G and a temperature-controlled wavelength is to be controlled in the narrowband wavelength range by a TEC controller, the first output optical path, the first detector, and the first electrical signal of the optical signal receiving apparatus are applicable to the uplink signal at the speed of about 25 G. Therefore, the second output optical path mainly allows the signal at the speed level of about 12.5 G to pass through. In the optical signal receiving apparatus, the signal at the speed of about 50 G is accordingly changed to the signal at the speed of about 50 G/25 G, and the signal at the speed of about 12.5 G/25 Gl is accordingly changed to the signal at the speed of about 12.5 G. Therefore, the optical signal receiving apparatus can be flexibly applied to various scenarios of transmitters for different speed levels and different wavelength ranges.

Figure 6:
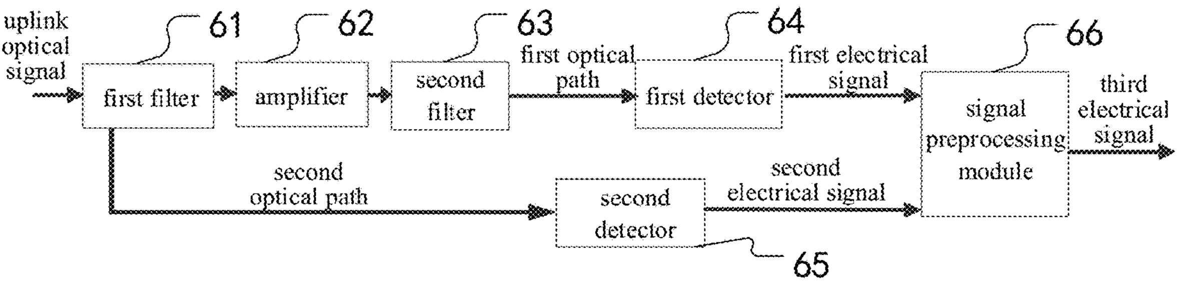
FIG. 6 is a schematic structural diagram of an optical signal receiving apparatus according to an embodiment of the present disclosure.

FIG. 6 is a schematic structural diagram of an optical signal receiving apparatus applicable to receiving optical signals at multiple speeds according to an embodiment of the present disclosure. As shown in FIG. 6, the receiving apparatus includes: a first filter 61, an amplifier 62, a second filter 63, a first detector 64, a second detector 65, and a signal preprocessing module 66. Operating principles of the first filter 61, the amplifier 62, the second filter 63, the first detector 64, and the second detector 65 are respectively similar to those of the first filter 21, the amplifier 22, the second filter 23, the first detector 24, and the second detector 25 shown in FIG. 2, and thus will not be repeated here. A main difference between the optical signal receiving apparatus shown in FIG. 6 and the optical signal receiving apparatus shown in FIG. 2 lies in the addition of the signal preprocessing module 66, and the signal preprocessing module 66 can preprocess the two electrical signals output by the first detector 64 and the second detector 65, so as to convert the two electrical signals into one transmission electrical signal to be output, which produces an effect of reducing the receiving pins.

In some implementations, the signal preprocessing module 66 is configured to preprocess the first electrical signal output by the first detector 64 and the second electrical signal output by the second detector 65 to obtain a third electrical signal after subjected to preprocessing, and output the third electrical signal as the transmission electrical signal to a signal receiving end. A main function of the signal preprocessing module 66 is to analyze and process the first electrical signal and the second electrical signal to obtain the transmission electrical signal to be output to the signal receiving end. A plurality of preprocessing methods may be adopted, for example, signal comparison processing or signal addition processing may be adopted, and correspondingly, the third electrical signal may be an electrical signal, with a better quality, extracted from the first electrical signal and the second electrical signal, or may be an electrical signal obtained after preprocessing, such as adding, the first electrical signal and the second electrical signal. Details of the implementation of the preprocessing are not limited in the present disclosure.

In some implementations, the signal preprocessing module 66 includes a signal comparison module. Correspondingly, the signal comparison module is configured to compare the first electrical signal with the second electrical signal in terms of at least one of a DC component, a peak-to-peak value, a signal-to-noise ratio, or a signal frequency to obtain a comparison result, and take the first electrical signal or the second electrical signal as the third electrical signal according to the comparison result.

In some implementations, the signal preprocessing module 66 includes a signal addition module. Correspondingly, the signal addition module is configured to add the first electrical signal to the second electrical signal to obtain the third electrical signal.

Since the optical signal receiving apparatus shown in FIG. 6 can convert the two electrical signals into one electrical signal by the signal preprocessing module 66, the signal receiving end is to be provided with merely one pair of receiving pins configured to receive the third electrical signal, and there is no need to provide two pairs of receiving pins for receiving the first electrical signal and the second electrical signal, so that the hardware cost of the signal receiving end is reduced, a size of the signal receiving end is reduced, and miniaturization packaging processing on the signal receiving end is facilitated. The signal receiving end in the optical signal receiving apparatus may be various network devices having a function of receiving optical signals, for example, the signal receiving end may be an optical line terminal, and correspondingly, the optical signal receiving apparatus provided in the present disclosure may be disposed inside the optical line terminal, or may be in communication connection with the optical line terminal.

In some implementations, in order to facilitate subsequent processing on the received electrical signal by the signal receiving end, the signal receiving end is to be informed of a speed level of the signal. Accordingly, the optical signal receiving apparatus shown in FIG. 6 may further include: a signal-speed-level indication module configured to determine a speed level of the third electrical signal according to a wavelength of the third electrical signal, and send a speed level indication signal to the signal receiving end. For example, if the third electrical signal is corresponding to the second electrical signal, it is indicated that the wavelength range of the signal is relatively wide and the speed of the signal is relatively low, and accordingly, a low-speed-level indication signal is sent to the signal receiving end by the signal-speed-level indication module; if the third electrical signal is corresponding to the first electrical signal, it is indicated that the signal may be a high-speed signal or a low-speed signal, and thus the speed of the signal is identified by the signal preprocessing module (for example, the speed of the signal may be identified by a frequency detection module), and accordingly, a high-speed-level indication signal or a low-speed-level indication signal is sent to the signal receiving end by the signal-speed-level indication module. Since the signal preprocessing module can determine the wavelength and the speed level of the third electrical signal during preprocessing the first electrical signal and the second electrical signal, the speed level indication signal can be sent to the signal receiving end according to a determination result.

Two optional implementations of the signal preprocessing module are described below.

In some implementations, the signal preprocessing module is a signal comparison module, and is configured to compare the quality of the first electrical signal with the quality of the second electrical signal, and output one of the first electrical signal and the second electrical signal that has the better quality. The signal comparison module comparing the quality of the first electrical signal with the quality of the second electrical signal includes: comparing the first electrical signal with the second electrical signal in terms of a magnitude of a DC component, a magnitude of a peak-to-peak value, a magnitude of a comparison reference level, a magnitude of a signal-to-noise ratio, and/or a magnitude of a frequency.

Figure 7:
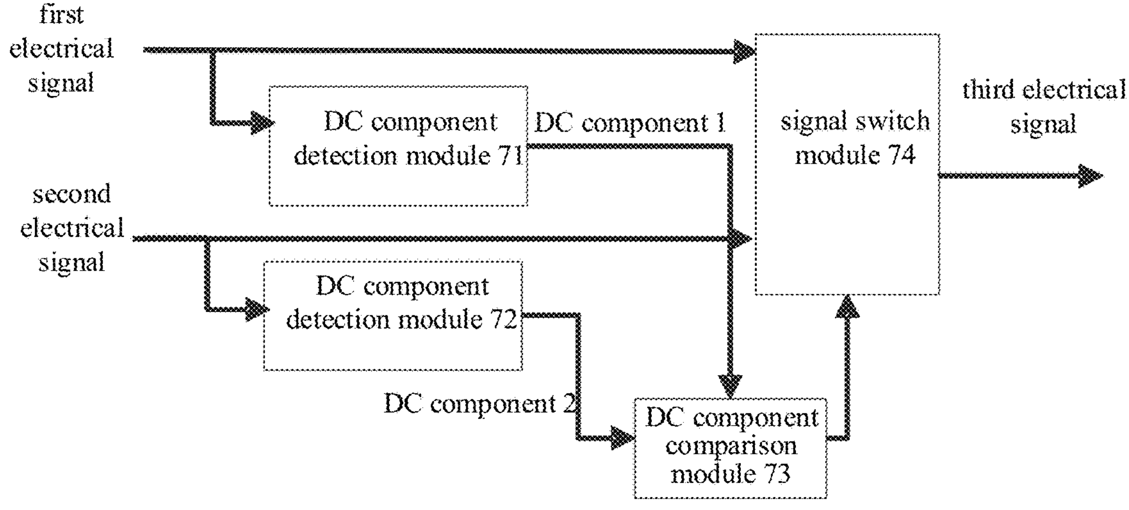
FIG. 7 is a schematic structural diagram in a case where a signal comparison module in an optical signal receiving apparatus according to an embodiment of the present disclosure is configured to compare magnitudes of direct-current (DC) components of signals for realizing a signal comparison.

FIG. 7 is a schematic structural diagram in a case where a signal comparison module in an optical signal receiving apparatus according to an embodiment of the present disclosure is configured to compare magnitudes of DC components of signals for realizing a signal comparison. As shown in FIG. 7, the signal comparison module includes: a DC component detection module 71, a DC component detection module 72, a DC component comparison module 73, and a signal switch module 74. The DC component detection module 71 and the DC component detection module 72 detect a DC component 1 of the first electrical signal and a DC component 2 of the second electrical signal respectively, and input the DC component 1 and the DC component 2 into the DC component comparison module 73. The DC component comparison module 73 compares magnitudes of the two input DC components to obtain a comparison result, and controls the signal switch module 74 according to the comparison result. In a case where the DC component 1 is greater than the DC component 2, the DC component comparison module 73 controls the signal switch module 74 to allow the first electrical signal (that is, the first electrical signal is taken as the third electrical signal) to pass through; in a case where the DC component 1 is less than the DC component 2, the DC component comparison module 73 controls the signal switch module 74 to allow the second electrical signal (that is, the second electrical signal is taken as the third electrical signal) to pass through; and in a case where the DC component 1 is equal to the DC component 2, the DC component comparison module 73 controls the signal switch module 74 to allow the second electrical signal to pass through, and the DC component comparison module 73 may be kept unchanged in a current state or may allow the second electrical signal to pass through.

Figure 8:
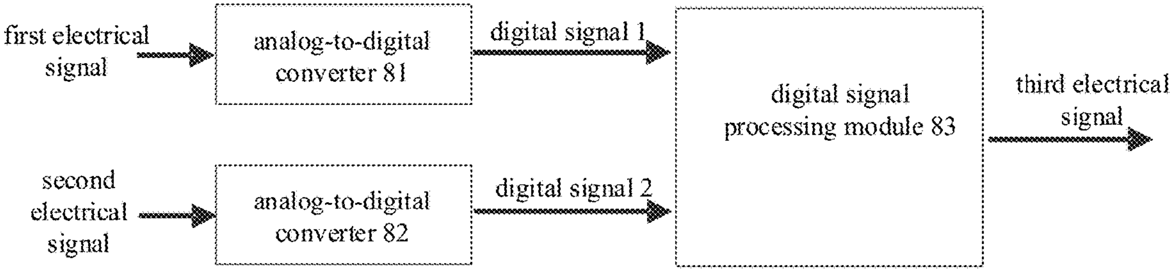
FIG. 8 is a schematic structural diagram in a case where a signal comparison module in an optical signal receiving apparatus according to an embodiment of the present disclosure is configured to compare magnitudes of peak-to-peak values of a first electrical signal and a second electrical signal for realizing a signal comparison.

FIG. 8 is a schematic structural diagram in a case where a signal comparison module in an optical signal receiving apparatus according to an embodiment of the present disclosure is configured to compare magnitudes of peak-to-peak values of the first electrical signal and the second electrical signal for realizing a signal comparison. As shown in FIG. 8, the signal comparison module includes: an analog-to-digital converter 81, an analog-to-digital converter 82, and a digital signal processing module 83. The analog-to-digital converter 81 samples the first electrical signal, converts the sampled first electrical signal into a digital signal 1, and inputs the digital signal 1 into the digital signal processing module 83; and the analog-to-digital converter 82 samples the second electrical signal, converts the sampled second electrical signal into a digital signal 2, and inputs the digital signal 2 into the digital signal processing module 83. The digital signal processing module 83 includes at least one of a DC blocking module with respect to the digital signal 1 and the digital signal 2, a clock recovery module or a peak-to-peak-value comparison module. The digital signal processing module 83 further includes a signal switch module configured to output one of the digital signal 1 and the digital signal 2 as the third electrical signal to the subsequent signal processing module according to the signal quality.

In a case where an uplink optical signal at the speed of about 50 G is input, the optical signal at the speed of about 50 G is converted into the first electrical signal through a first optical path of the OLT multi-speed receiving apparatus (i.e., the optical signal receiving apparatus), and the first electrical signal is input into the analog-to-digital converter 81, in this case, a second optical path of the OLT multi-speed receiving apparatus is cut off, no differential signal of the second optical signal is output, and no signal is output after the digital signal 2 output by the analog-to-digital converter 82 is processed by the DC blocking module. The digital signal processing module 83 selects the digital signal 1 as the third electrical signal to output it. In a case where an uplink optical signal at the speed of about 12.5 G/25 G is input and a wavelength of the optical signal at the speed of about 12.5 G/25 G is in a cut-off wavelength range of the first optical path and a passband wavelength range of the second optical path, the optical signal at the speed of about 12.5 G/25 G is cut off in the first optical path of the OLT multi-speed receiving apparatus, the digital signal 1 output by the digital-to-analog converter 81 is a DC noise signal, and no signal is output after the digital signal 1 output by the digital-to-analog converter 81 is processed by the DC blocking module. The analog-to-digital converter 82 outputs a normal differential signal. The digital signal processing module 83 selects the digital signal 2 as the third electrical signal to output it. In a case where an uplink optical signal at the speed of about 12.5 G/25 G is input and a wavelength of the optical signal at the speed of about 12.5 G/25 G is in wavelength ranges of transition bands of the first optical path and the second optical path, the optical signal at the speed of about 12.5 G/25 G is output through the first optical path and the second optical path of the OLT multi-speed receiving apparatus, the analog-to-digital converter 81 and the analog-to-digital converter 82 output the digital signal 1 and the digital signal 2 respectively, and the digital signal processing module 83 may compare magnitudes of peak-to-peak values of levels of the two digital signals to select one of the two digital signals that has the greater peak-to-peak value to output it. In some implementations, the digital signal processing module 83 may further include a digital equalization module, which is configured to recover the quality of an input electrical signal, detect signal-to-noise ratios of the digital signal 1 and the digital signal 2 simultaneously, and select one of the digital signal 1 and the digital signal 2 that has the greater signal-to-noise ratio as the third electrical signal to output it.

Figure 9:
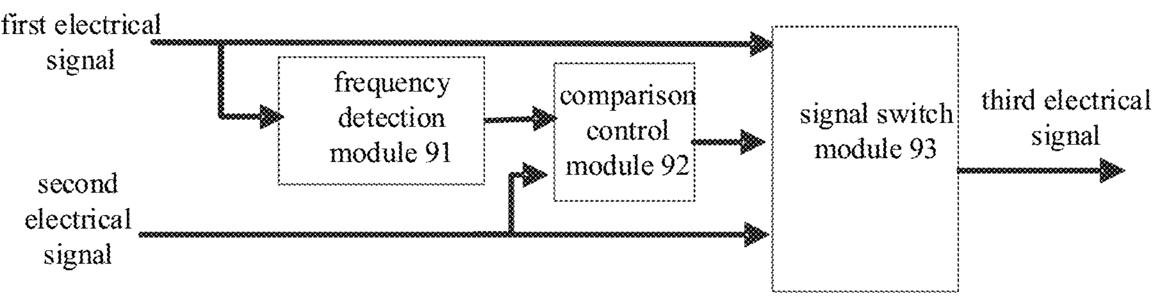
FIG. 9 is a schematic structural diagram in a case where a signal comparison module in an optical signal receiving apparatus according to an embodiment of the present disclosure is configured to detect a magnitude of a frequency of a first electrical signal for realizing a signal comparison.

FIG. 9 is a schematic structural diagram in a case where a signal comparison module in an optical signal receiving apparatus according to an embodiment of the present disclosure is configured to detect a magnitude of a frequency of the first electrical signal for realizing a signal comparison. As shown in FIG. 9, the signal comparison module includes a frequency detection module 91, a comparison control module 92, and a signal switch module 93. The frequency detection module 91 detects a magnitude of a frequency of the first electrical signal, and performs low-pass filtering on an electrical signal at the speed of about 25 G or at a lower speed. The comparison control module 92 compares a magnitude of the first electrical signal subjected to the low-pass filtering with a magnitude of the second electrical signal, and sends a switch indication signal to the signal switch module 93. In a case where an uplink optical signal at the speed of about 50 G is input, if the frequency detection module 91 detects that the frequency of the first electrical signal is greater than 25 GHz, and the comparison control module 92 controls the signal switch module 93 to allow the first electrical signal to pass through; in a case where an uplink optical signal at the speed of about 25 G/12.5 G is input, if the frequency detection module 91 detects that the frequency of the first electrical signal is less than or equal to 25 GHz, the comparison control module 92 compares the magnitude of the first electrical signal subjected to the low-pass filtering with the magnitude of the second electrical signal, if the magnitude of the first electrical signal subjected to the low-pass filtering is greater than the size of the second electrical signal, the comparison control module 92 controls the signal switch module 93 to allow the first electrical signal to pass through, and if the magnitude of the first electrical signal subjected to the low-pass filtering is less than the magnitude of the second electrical signal, the comparison control module 92 controls the signal switch module 93 to allow the second electrical signal to pass through. The frequency detection module 91 includes: a DC blocking submodule configured to perform DC blocking processing on the first electrical signal; and correspondingly, the frequency detection module 91 is configured to detect the magnitude of the frequency of the first electrical signal subjected to the DC blocking processing.

In some implementations, the signal preprocessing module is a signal addition module configured to add the input first electrical signal to the input second electrical signal to obtain a fourth electrical signal (corresponding to the third electrical signal) and outputs the fourth electrical signal. The signal addition module includes a DC blocking and noise reducing module and a signal adder module, and the DC blocking and noise reducing module is configured to respectively perform DC component isolation and noise reduction on the first electrical signal and the second electrical signal. The signal adder module is configured to combine the two electrical signals subjected to the DC component isolation and the noise reduction and output the combined electrical signal as the fourth electrical signal.

Figure 10:
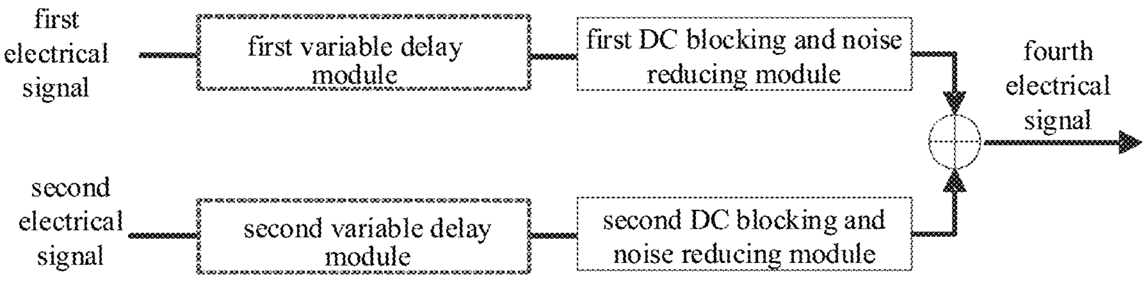
FIG. 10 is a schematic structural diagram of a signal addition module including a variable delay module in an optical signal receiving apparatus according to an embodiment of the present disclosure.

In some implementations, the signal addition module further includes a variable delay module, which performs signal variable delaying on the first electrical signal or the second electrical signal, so as to ensure that delays of such two signals are equal to each other in a case where a wavelength of an uplink signal is in the transition band of the filter, thereby preventing a signal jitter from occurring. FIG. 10 is a schematic structural diagram of a signal addition module including a variable delay module in an optical signal receiving apparatus according to an embodiment of the present disclosure.

Figure 11:
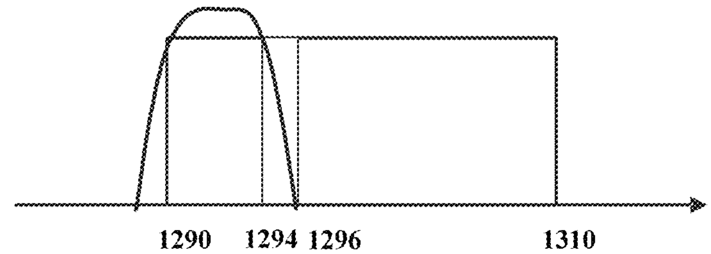
FIG. 11 is a schematic diagram illustrating a wavelength division manner according to an embodiment of the present disclosure.

The optical signal receiving apparatus shown in each of FIG. 1, FIG. 2, and FIG. 6 adopts the wavelength division manner illustrated by FIG. 4. Since there is an overlapping region between the first wavelength range and the second wavelength range in FIG. 4, in a case where an uplink low-speed-level optical signal is transmitted by a transmitter equipped with an uncooled laser, a wavelength of the uplink low-speed-level optical signal may fall in the transition bands of the first filter, so that both the first detector and the second detector may output the electrical signals, and therefore, one of the electrical signals, output by the detectors, that has the higher quality is to be selected to be output, which produces the result that the signal preprocessing module is relatively complex. In order to solve the above problem, the existing uplink wavelength range of the 50 G PON is divided into two sub-channels, including a narrowband sub-channel and a wideband sub-channel, the wavelengths of such two sub-channels are not overlapped, and a certain spacing transition band is provided between the two sub-channels. Accordingly, it is ensured that a wideband uncooled laser can be adopted for the optical signal at the speed of about 12.5 G/25 G, and a narrowband laser and an SOA receiver are adopted for the optical signal at the speed of about 50 G/25 G. Taking a wavelength option from 1290 nm to 1310 nm as an example, the wavelength range from 1290 nm to 1310 nm may be divided as follows: the narrowband sub-channel (corresponding to the first wavelength range) is from 1290 nm to 1294 nm, the wideband sub-channel (corresponding to the second wavelength range) is from 1296 nm to 1310 nm, and a transition isolation band between such two sub-channels is from 1294 nm to 1296 nm. FIG. 11 is a schematic diagram illustrating a wavelength division manner according to an embodiment of the present disclosure.

An optical signal receiving apparatus adopting the wavelength division manner illustrated by FIG. 11 may be implemented by a structure shown in FIG. 2. In other words, the optical signal receiving apparatus adopting the wavelength division manner illustrated by FIG. 11 has the same structure as the optical signal receiving apparatus shown in FIG. 2, and differs from the optical signal receiving apparatus shown in FIG. 2 merely in the division of the wavelength range. Correspondingly, the characteristics of the first filter in the optical signal receiving apparatus adopting the wavelength division manner illustrated by FIG. 11 are also different from the characteristics of the first filter 21 in the optical signal receiving apparatus shown in FIG. 2. The first filter in the optical signal receiving apparatus adopting the wavelength division manner illustrated by FIG. 11 has following characteristics: for the first output optical path, the wavelengths of the narrowband sub-channel belong to a passband, and the wavelengths of the wideband sub-channel are cut off; for the second output optical path, the wavelengths of the wideband sub-channel belong to a passband, and the wavelengths of the narrowband sub-channel are cut off; and the transition isolation band between the two sub-channels is a transition band of the filter, and both the first output optical path and the second output optical path output optical signals. By adopting the above wavelength division manner, the uplink optical signals at different speed levels are input to fixed detectors and converted into electrical signals to be output. For example, in a case where an uplink optical signal at the speed of about 50 G is applied to the narrowband sub-channel and an uplink optical signal at the speed of about 12.5 G/25 G is applied to the wideband sub-channel, the uplink optical signal at the speed of about 50 G is output by the first detector through the first optical path (i.e., the first output optical path); and the uplink optical signal at the speed of about 12.5 G/25 G is output by the second detector through the second optical path (i.e., the second output optical path). In a case where the apparatus is applied to a 50 G PON system, the signal selection module is not desired to be provided in a 50 G PON Media Access Control (MAC) chip, and the uplink signals at different speed levels may be selected according to the reading of DBA scheduling information to be input into an MAC protocol processing module; or the signal selection module is not to be configured to select the signals at different speed levels to be output to the subsequent signal processing signal. In the optical signal receiving apparatus adopting the wavelength division manner illustrated by FIG. 11, the first detector and the second detector may select a detector and a TIA device which have appropriate bandwidths according to a speed level of a signal, so that adopting a high-speed device for a low-speed-level optical signal can be obviated, thereby facilitating reduction of cost and noise.

For example, in some implementations, in a case where the wavelength planning illustrated by FIG. 11 is adopted, the first filter may be a sideband filter (for example, for the first optical path, the wavelengths less than 1294 nm belong to a passband and the wavelengths greater than 1296 nm are cut off; and for the second optical path, the wavelengths less than 1294 nm are cut off and the wavelengths greater than 1296 nm belong to a passband), and the second filter may be a vertical incidence bandpass filter (for example, the wavelengths from 1290 nm to 1294 nm belong to a passband and the other wavelengths are cut off). In such case, expectations on the accuracy of packaging of the filters can be reduced, which is favorable to a reduction of difficulty of the packaging. Similarly, the first detector and the second detector may select a detector and a TIA device which have appropriate bandwidths according to a speed level of a signal, so that adopting a high-speed device for a low-speed-level optical signal can be obviated, thereby facilitating the reduction of cost and noise.

In some implementations, if the number of receiving pins of the optical signal receiving apparatus is to be reduced, the optical signal receiving apparatus may further include a signal selection module. A selection state of the signal selection module may be controlled by sending a speed indication signal through OLT PON MAC. In some implementations, the selection state of the signal selection module may also be controlled by comparing magnitudes of RSSI signals of the first detector and the second detector. In some implementations, the selection state of the signal selection module may also be determined according to frequencies of the received optical signals, so that the high-frequency electrical signal is allowed to pass through, and in this case, no external control signal is desired.

Figure 12:
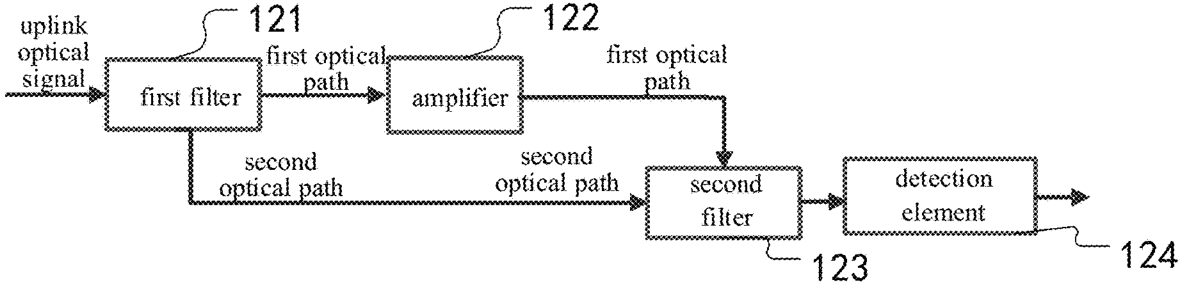
FIG. 12 is a schematic structural diagram of an optical signal receiving apparatus according to an embodiment of the present disclosure.

FIG. 12 is a schematic structural diagram of an optical signal receiving apparatus applicable to receiving optical signals at multiple speeds according to an embodiment of the present disclosure. The optical signal receiving apparatus includes: a first filter 121, an amplifier 122, a second filter 123, and a detection element 124. The second filter 123 is provided with a first input optical path and a second input optical path, and is configured to receive the amplified first optical signal through the first input optical path, perform noise reduction processing on the amplified first optical signal, and output the noise-reduced first optical signal (i.e., the first optical signal subjected to the noise reduction processing) to the detection element through an output optical path; and/or to receive the second optical signal corresponding to the second wavelength range through the second input optical path, and output the second optical signal corresponding to the second wavelength range to the detection element through the output optical path. Thus, the second filter 123 having two input optical paths can merge the first optical signal and the second optical signal into one optical signal to output it, so that the detection element can be implemented by merely one detector, which greatly reduces the cost of the device.

In a case where the wavelength division manner adopted by the optical signal receiving apparatus shown in FIG. 12 is the wavelength division manner illustrated by FIG. 11, the characteristics of the first filter 121 may be the same as those of the first filter in the above optical signal receiving apparatus adopting the wavelength division manner illustrated by FIG. 11; and the characteristics of the second filter 123 are as follows: for the first output optical path (e.g., the reflection optical path) of the second filter 123, the wavelength range from 1290 nm to 1294 nm is a passband, the wavelength range from 1296 nm to 1310 nm is a cut-off wavelength range, and the wavelength range from 1294 nm to 1296 nm is a transition band; for the second output optical path (e.g., the transmission optical path) of the second filter, the wavelength range from 1296 nm to 1310 nm is a passband, the wavelength range from 1290 nm to 1294 nm is a cut-off wavelength range, and the wavelength range from 1294 nm to 1296 nm is a transition band. In a case where the wavelength division manner adopted by the optical signal receiving apparatus shown in FIG. 12 is the wavelength division manner illustrated by FIG. 4, the characteristics of the first filter 121 may be the same as those of the first filter 21 in the optical signal receiving apparatus shown in FIG. 2, which is not limited in the present disclosure.

Figure 13:
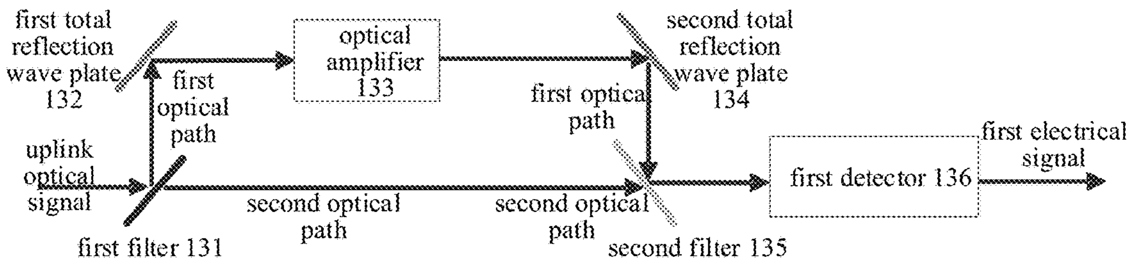
FIG. 13 is a schematic diagram illustrating device structures of an optical signal receiving apparatus according to an embodiment of the present disclosure.

FIG. 13 is a schematic diagram illustrating structures of devices of an optical signal receiving apparatus according to an embodiment of the present disclosure. As shown in FIG. 13, the optical signal receiving apparatus includes: a first filter 131, a first total reflection wave plate 132, an optical amplifier 133, a second total reflection wave plate 134, a second filter 135, and a first detector 136. The uplink optical signals pass through the first filter 131 and then are output through the first optical path or the second optical path, and the optical signal in the first optical path is reflected by the first total reflection wave plate 132, transmitted to the optical amplifier 133 to be amplified, reflected by the second total reflection wave plate 134, and then transmitted to the second filter 135; and the optical signal in the second optical path is output to the first detector 136 through the second filter 135.

Figure 14:
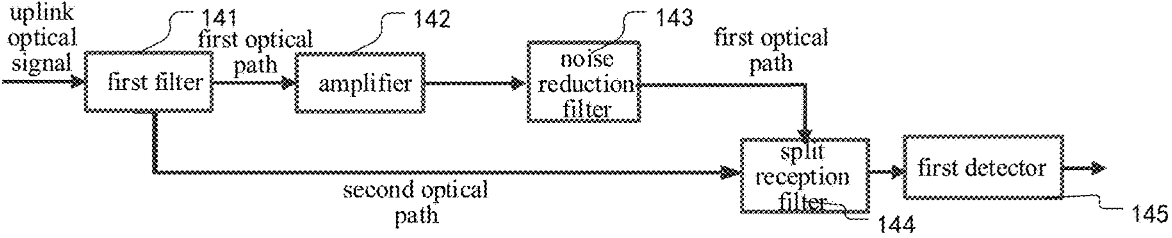
FIG. 14 is a schematic structural diagram of an optical signal receiving apparatus according to an embodiment of the present disclosure.

FIG. 14 is a schematic structural diagram of an optical signal receiving apparatus according to an embodiment of the present disclosure. A main difference between the optical signal receiving apparatus shown in FIG. 14 and the optical signal receiving apparatus shown in FIG. 12 lies in that the second filter includes: a noise reduction filter and a split reception filter; the noise reduction filter is connected to the amplifier, and is configured to receive the amplified first optical signal, perform noise reduction processing on the amplified first optical signal, and transmit the noise-reduced first optical signal to the split reception filter; the split reception filter is provided with a first input optical path and a second input optical path, and is configured to receive the noise-reduced first optical signal through the first input optical path, and output the noise-reduced first optical signal to the detection element through an output optical path; and/or to receive the second optical signal corresponding to the second wavelength range through the second input optical path, and output the second optical signal corresponding to the second wavelength range to the detection element through the output optical path.

As shown in FIG. 14, the optical signal receiving apparatus includes: a first filter 141, an amplifier 142, a noise reduction filter 143, a split reception filter 144, and a first detector 145. The characteristics of the first filter 141 are the same as those of the first filter 121 in the optical signal receiving apparatus shown in FIG. 12, and are mainly configured to realize a wavelength division; the characteristics of the noise reduction filter 143 are the same as those of the second filter in the above optical signal receiving apparatus adopting the wavelength division manner illustrated by FIG. 11, and is mainly configured to realize noise reduction processing; and the characteristics of the split reception filter 144 are the same as those of the first filter 141. With the structure shown in FIG. 14, a high-speed optical signal (corresponding to the narrow wavelength range) can be output to the first detector 145 through the first optical path, and a low-speed optical signal (corresponding to the wide wavelength range) can be output to the first detector 145 through the second optical path.

Figure 15:
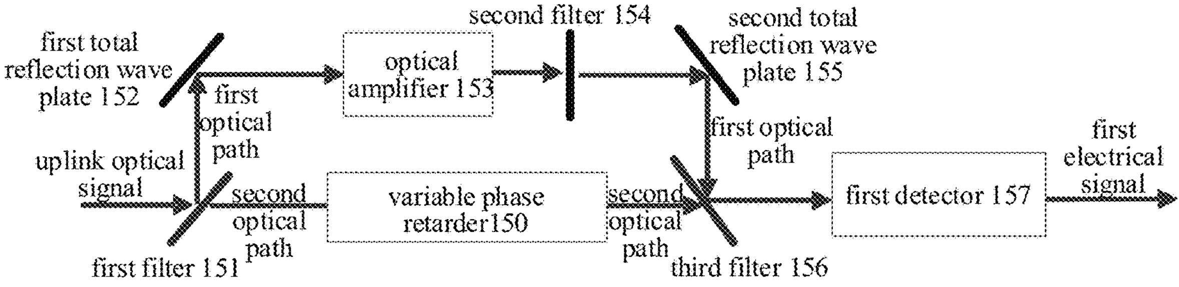
FIG. 15 is a schematic diagram illustrating device structures of an optical signal receiving apparatus according to an embodiment of the present disclosure.

FIG. 15 is a schematic diagram illustrating structures of devices of an optical signal receiving apparatus according to an embodiment of the present disclosure. As shown in FIG. 15, the optical signal receiving apparatus includes: a first filter 151, a first total reflection wave plate 152, an optical amplifier 153, a second filter 154, a second total reflection wave plate 155, a third filter 156, and a first detector 157. With such optical signal receiving apparatus, in a case where an uplink signal is a narrowband uplink signal at the speed of about 50 G, the uplink signal is input to the first detector 157 through the first optical path. In a case where the uplink signal is a narrowband uplink signal at the speed of about 12.5 G/25 G in a passband of the filter 151 and beyond the transition band, the uplink signal is input to the first detector 157 through the second optical path. In a case where the uplink signal is in the transition band of the filter 151, the uplink signal is input into the first detector 157 through the first optical path and the second optical path respectively. The second optical path further includes a variable phase retarder 150 configured to perform phase retardation on the input uplink signal to prevent the first detector 157 from generating a signal jitter and a signal coherent cancellation.

The above implementations may be combined or replaced with each other, for example, the wavelength division manner illustrated by FIG. 4 or FIG. 11 may be flexibly selected in each implementation, and the characteristics of the filters may be set according to the selected wavelength division manner. The original optical signals in the above implementations may be uplink optical signals transmitted from an optical network unit to an optical line terminal.

In addition, an embodiment of the present disclosure further provides an optical line terminal, including: the optical signal receiving apparatus described above. In addition, in a case where the optical signal receiving apparatus includes the first detector and the second detector, the optical line terminal includes: the signal selection module configured to determine a speed level of the signal corresponding to a current scheduled time slot according to a corresponding relationship, between scheduled time slots and speeds of signals, stored in a time slot scheduling table, and select the first electrical signal or the second electrical signal as the effective electrical signal according to the speed level of the signal.

In addition, an embodiment of the present disclosure further provides an optical signal receiving system, including: the optical line terminal described above, and an optical network unit.

Figure 16:
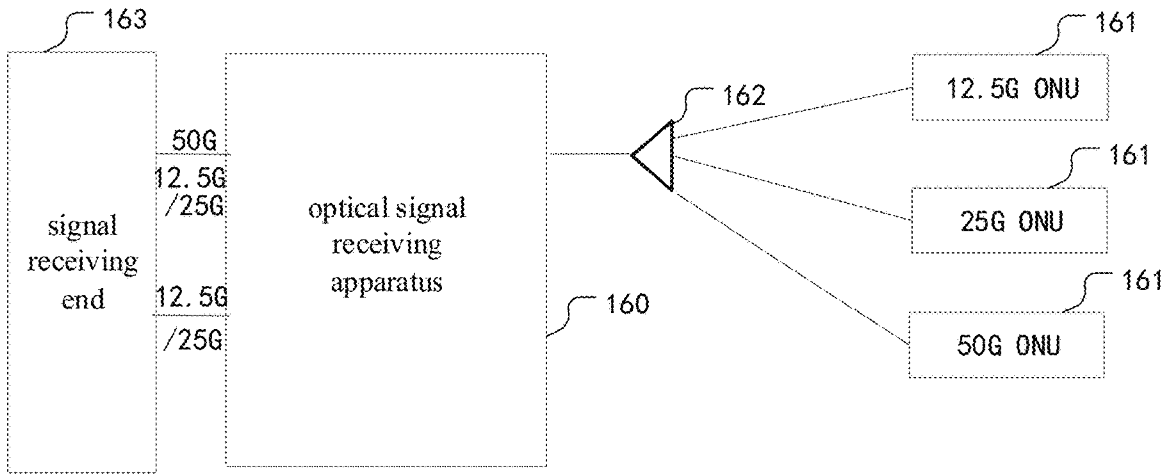
FIG. 16 is a schematic structural diagram of an optical signal receiving system according to an embodiment of the present disclosure.

For example, FIG. 16 is a schematic structural diagram of an optical signal receiving system according to an embodiment of the present disclosure. As shown in FIG. 16, the optical signal receiving system includes: an optical signal receiving apparatus 160, an optical splitter 162, a plurality of Optical Network Units (ONUs) 161, and a signal receiving end 163. The optical signal receiving apparatus 60 may be implemented as the optical signal receiving apparatus having any of the above structures, and will not be described in detail below. The signal receiving end 163 may be an optical line terminal. The signal receiving end 163 may include 50

G PON MAC. The plurality of ONUs 161 serve as signal transmitting ends, the ONUs 161 can transmit optical signals at different speed levels, and the transmitted optical signals include optical signals at multiple different speed levels, including optical signals at the speed level of about 12.5 G, the speed level of about 25 G, and the speed level of about 50 G, or the like. The optical signals that are respectively corresponding to different speed levels and transmitted by the plurality of ONUs 161 are processed by the optical splitter 162, and then are sent to the optical signal receiving apparatus described above.

In some implementations, in the receiving system shown in FIG. 16, a signal amplification module and a clock data recovery module may be further provided between the optical signal receiving apparatus 160 and the signal receiving end 163. The signal amplification module is configured to amplify the first electrical signal and the second electrical signal output by the optical signal receiving apparatus, and the clock data recovery module is configured to perform clock data recovery on the signals.

In some implementations, the signal receiving end 163 includes a signal selection unit, for example, in a case where the signal receiving end is an optical line terminal, the signal selection unit is included in a 50 G PON MAC chip of the optical line terminal, and is configured to determine a speed level of the signal corresponding to a current scheduled time slot according to a corresponding relationship, between scheduled time slots and speeds of signals, stored in a time slot scheduling table, and select the first electrical signal or the second electrical signal as the effective electrical signal according to the speed level of the signal. For example, the time slot scheduling table is read according to DBA scheduling information, so that uplink signals at different speed levels are selected to be transmitted to an MAC protocol processing module. In a case where signals at the speed level of about 12.5 G/25 G simultaneously appear in the pins for the first electrical signal and the second electrical signal, according to the bit error rates in the physical layer (PHY), one of the first electrical signal and the second electrical signal that has the lower error rate may be selected to enter a Framing sublayer of the MAC protocol processing module.

In an actual application scenario, the optical signal receiving apparatus 160 may be implemented according to any of the above implementations, and correspondingly, the optical signal receiving apparatus 160 may output two optical signals or one optical signal, which depends on the structure of the optical signal receiving apparatus. In short, the optical signal receiving apparatus adopting any of the above structures can be applied to the system shown in FIG. 16, which will not be described in detail herein.

In summary, by adopting the technical solutions described in the above implementations, in the 50 G PON system, the uncooled laser can be adopted for the uplink optical signals at the speed level of about 25 G/12.5 G, and the uplink optical signals at the speed level of about 25 G/12.5 G may operate at any wavelength within the uplink wavelength range. In a case where a low-speed wavelength falls in the narrowband wavelength range, the optical signal is converted into the electrical signal to be output by the first detector through the first optical path; in a case where the low-speed wavelength goes beyond the narrowband wavelength range, the optical signal is converted into the electrical signal to be output by the second detector through the second optical path; in a case where the low-speed wavelength falls in the transition band between the passband range and the cut-off wavelength range of the filter, the optical signal is divided to be output in two paths, so that the optical signal output in one path is converted into the first electrical signal to be output by the first detector through the first optical path, and the optical signal output in the other path is converted into the second electrical signal to be output by the second detector through the second optical path. With the above technical solutions, the optical signals at multiple speed levels can be compatibly supported, and the two electrical signals can be converted into one electrical signal by the signal preprocessing module, so that the signal receiving end is to be provided with merely one pair of receiving pins, thereby greatly reducing the cost of the receiving end, reducing the size of the receiving end, and facilitating the miniaturization packaging of the device. Moreover, one detector can be omitted by reasonably setting the characteristics of the second filter, so as to output both of the two optical signals by a same detector.

An embodiment of the present disclosure further provides an optical signal receiving method applicable to receiving optical signals at multiple speeds. The optical signal receiving method includes following operation one to operation three.

In operation one, wavelength division processing is performed on original optical signals, and at least one of a first optical signal corresponding to a first wavelength range or a second optical signal corresponding to a second wavelength range is output.

This operation may be performed by the first filter in the optical signal receiving apparatus provided in the present disclosure, and the implementation of the operation can be referred to the above description of the first filter in the optical signal receiving apparatus.

In operation two, the first optical signal corresponding to the first wavelength range is amplified to obtain the amplified first optical signal. This operation may be performed by the amplifier described above.

In operation three, the amplified first optical signal is received, noise reduction processing is performed on the amplified first optical signal, and the noise-reduced first optical signal and/or the second optical signal corresponding to the second wavelength range are/is converted into a transmission electrical signal. This operation may be performed by the detection element in the optical signal receiving apparatus provided in the present disclosure, and details of the implementation may be referred to the above description of the corresponding parts in the optical signal receiving apparatus, and will not be repeated here.

An embodiment of the present disclosure further provides a computer-readable storage medium having stored therein a computer program, the computer program, executed by a processor, causes the processor to implement the optical signal receiving method described above.

It should be understood by those of ordinary skill in the art that the functional modules/units in all or some of the operations, the systems, and the devices in the methods disclosed above may be implemented as software, firmware, hardware, or suitable combinations thereof. If implemented as hardware, the dividing between the functional modules/units stated above is not necessarily corresponding to the dividing of physical components; for example, one physical component may have a plurality of functions, or one function or operation may be performed through cooperation of several physical components. Some or all of the physical components may be implemented as software executed by a processor, such as a CPU, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable medium used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory (FLASH) or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication medium generally includes computer-readable instructions, data structures, program modules, or other data in modulated data signals such as carrier wave or other transmission mechanism, and may include any information delivery medium.

The present disclosure discloses the exemplary embodiments described in detail, but the exemplary embodiments are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details may be made without departing from the scope of the present disclosure as claimed by the appended claims.

What is claimed is:

1. An optical signal receiving apparatus, configured to receive optical signals at multiple speeds, comprising: a first filter, an amplifier, a second filter, and a detection element; wherein the first filter is configured to perform wavelength division processing on original optical signals, and perform at least one of following operations: outputting a first optical signal corresponding to a first wavelength range through a first output optical path, or outputting a second optical signal corresponding to a second wavelength range through a second output optical path;

the amplifier is configured to amplify the first optical signal corresponding to the first wavelength range to obtain the amplified first optical signal;

the second filter is configured to receive the amplified first optical signal, perform noise reduction processing on the amplified first optical signal, and transmit the first optical signal subjected to the noise reduction processing to the detection element; and the detection element is configured to receive at least one of the first optical signal subjected to the noise reduction processing or the second optical signal corresponding to the second wavelength range, wherein the detection element comprises a first detector and a second detector, the first detector is connected to the second filter, and is configured to receive the first optical signal subjected to the noise reduction processing, and convert the first optical signal subjected to the noise reduction processing into a first electrical signal, and the second detector is connected to the first filter, and is configured to receive the second optical signal corresponding to the second wavelength range, and convert the second optical signal corresponding to the second wavelength range into a second electrical signal, the optical signal receiving apparatus further comprises a signal preprocessing module configured to preprocess the first electrical signal output by the first detector and the second electrical signal output by the second detector to obtain a third electrical signal, and output the third electrical signal as a transmission electrical signal to a signal receiving end, the third electrical signal is generated according to at least one of the first electrical signal or the second electrical signal.

2. The apparatus of claim 1, wherein the signal preprocessing module comprises: a signal comparison module or a signal addition module;

wherein the signal comparison module is configured to compare the first electrical signal with the second electrical signal in terms of at least one of a direct current component, a peak-to-peak value, a signal-to-noise ratio, or a signal frequency to obtain a comparison result, and take the first electrical signal or the second electrical signal as the third electrical signal according to the comparison result; and the signal addition module is configured to add the first electrical signal to the second electrical signal to obtain the third electrical signal.

3. The apparatus of claim 1, wherein the signal receiving end is provided with a pair of receiving pins configured to receive the third electrical signal;

the optical signal receiving apparatus further comprises:

a signal-speed-level indication module configured to determine a speed level of the third electrical signal according to a wavelength of the third electrical signal, and send a speed level indication signal to the signal receiving end.

4. The apparatus of claim 1, wherein a division of the first wavelength range and the second wavelength range is carried out according to a corresponding relationship between speeds and wavelengths of the optical signals, such that the first wavelength range is corresponding to the original optical signal at a first speed, and the second wavelength range is corresponding to the original optical signal at a second speed; the corresponding relationship between the speeds and the wavelengths of the optical signals is determined according to parameters of a laser of an optical signal transmitting end; wherein the first speed is greater than the second speed, and the first wavelength range is less than the second wavelength range;

wherein the first speed comprises 50 gigabits per second (Gbit/s), and the second speed comprises at least one of 12.5 Gbit/s or 25 Gbit/s.

5. The apparatus of claim 1, wherein the first wavelength range is in a middle region of the second wavelength range; or the first wavelength range and the second wavelength range are not overlapped and a spacing transition band is provided between the first wavelength range and the second wavelength range;

wherein, in a case where the first wavelength range is in the middle region of the second wavelength range, the second wavelength range comprises: a first sub-range on a first side of the first wavelength range, and a second sub-range on a second side of the first wavelength range.

6. The apparatus of claim 1, wherein the original optical signals are uplink optical signals transmitted from an optical network unit to an optical line terminal.

7. An optical line terminal, comprising: the optical signal receiving apparatus of claim 1.

8. The optical line terminal of claim 7, further comprising:

a signal selection module configured to determine a speed level of a signal corresponding to a current scheduled time slot according to a corresponding relationship, between scheduled time slots and speeds of signals, stored in a time slot scheduling table, and select a first electrical signal or a second electrical signal as an effective electrical signal according to the speed level of the signal.

9. An optical signal receiving system, comprising: the optical line terminal of claim 7, and an optical network unit.

10. The apparatus of claim 2, wherein the signal receiving end is provided with a pair of receiving pins configured to receive the third electrical signal;

the optical signal receiving apparatus further comprises:

a signal-speed-level indication module configured to determine a speed level of the third electrical signal according to a wavelength of the third electrical signal, and send a speed level indication signal to the signal receiving end.

11. An optical signal receiving method, configured to receive optical signals at multiple speeds, comprising:

performing wavelength division processing on original optical signals, and outputting at least one of a first optical signal corresponding to a first wavelength range or a second optical signal corresponding to a second wavelength range;

amplifying the first optical signal corresponding to the first wavelength range to obtain the amplified first optical signal;

receiving the amplified first optical signal, performing noise reduction processing on the amplified first optical signal, converting the amplified first optical signal subjected to the noise reduction processing into a first electrical signal;

converting the second optical signal corresponding to the second wavelength range into a second electrical signal; and preprocessing the first electrical signal and the second electrical signal to obtain a third electrical signal, and output the third electrical signal as a transmission electrical signal to a signal receiving end, wherein the third electrical signal is generated according to at least one of the first electrical signal or the second electrical signal.

12. An optical line terminal, comprising an optical signal receiving apparatus, the optical signal receiving apparatus is configured to receive optical signals at multiple speeds and comprises a first filter, an amplifier, a second filter, and a detection element, wherein the first filter is configured to perform wavelength division processing on original optical signals, and perform at least one of following operations: outputting a first optical signal corresponding to a first wavelength range through a first output optical path, or outputting a second optical signal corresponding to a second wavelength range through a second output optical path;

the amplifier is configured to amplify the first optical signal corresponding to the first wavelength range to obtain the amplified first optical signal;

the second filter is configured to receive the amplified first optical signal, perform noise reduction processing on the amplified first optical signal, and transmit the first optical signal subjected to the noise reduction processing to the detection element; and the detection element is configured to receive at least one of the first optical signal subjected to the noise reduction processing or the second optical signal corresponding to the second wavelength range, and convert at least one of the first optical signal subjected to the noise reduction processing or the second optical signal corresponding to the second wavelength range into a transmission electrical signal, wherein the optical line terminal further comprises a signal selection module configured to determine a speed level of a signal corresponding to a current scheduled time slot according to a corresponding relationship, between scheduled time slots and speeds of signals, stored in a time slot scheduling table, and select a first electrical signal or a second electrical signal as an effective electrical signal according to the speed level of the signal.

* * * * *